Figure 1:
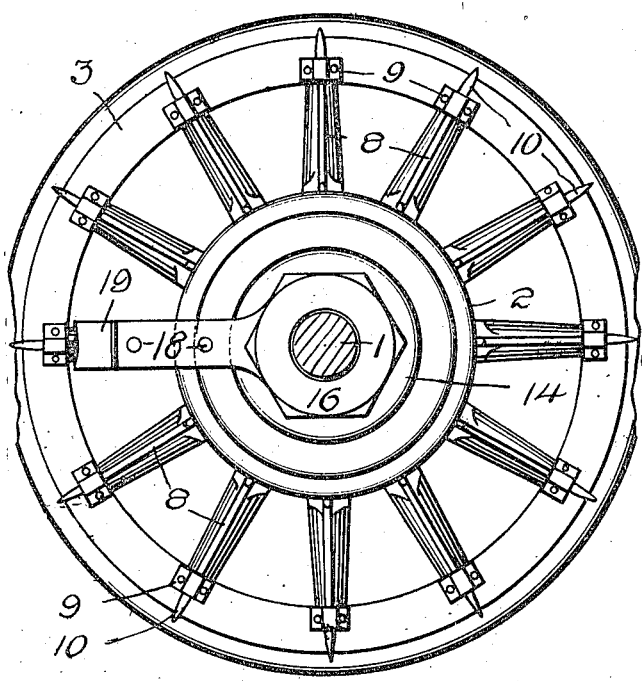

P. D. ALBERT.
ANTISKIDDING DEVICE.
APPLICATION FILED OCT. 11, 1912.

1,065,096.

Patented June 17, 1913.

WITNESSES

INVENTOR
P. D. Albert.

ATTORNEYS

UNITED STATES PATENT OFFICE.

PORTER D. ALBERT, OF NEW BETHLEHEM, PENNSYLVANIA.

ANTISKIDDING DEVICE.

1,065,096.  Specification of Letters Patent.  Patented June 17, 1913.

Application filed October 11, 1912. Serial No. 725,183.

*To all whom it may concern:*

Be it known that I, PORTER D. ALBERT, a citizen of the United States of America, residing at New Bethlehem, in the county of Clarion and State of Pennsylvania, have invented certain new and useful Improvements in Antiskidding Devices, of which the following is a specification, reference being had therein to the accompanying drawing.

This invention relates to an antiskidding device for vehicle wheels, and the objects of my invention are to increase the roadworthiness of a vehicle, as an automobile by providing the rear wheels thereof with antiskidding means, as hereinafter set forth, for preventing a vehicle from sliding or slipping upon smooth and wet surfaces, and to furnish vehicle wheels with road-gripping means that is independent of the tires of the wheels, thereby permitting of the anti-skidding means being used in connection with any type of tire.

Further objects of my invention are to provide an automobile with an anti-skidding device that is operable at will, the device being located so as not to impair the general appearance of the machine, and to accomplish the above results by a device that is positive in its action, free from injury by ordinary use, and highly efficient for preventing the loss of life and the destruction of motor driven vehicles, particularly racing cars.

I attain the above objects by a mechanical construction that will be hereinafter specifically described and then claimed, and reference will now be had to the drawing, wherein there is illustrated a preferred embodiment of my invention, but it is to be understood that the structural elements are susceptible to such changes, as in size, shape and manner of assemblage, as fall within the scope of the appended claim.

Figure 2:
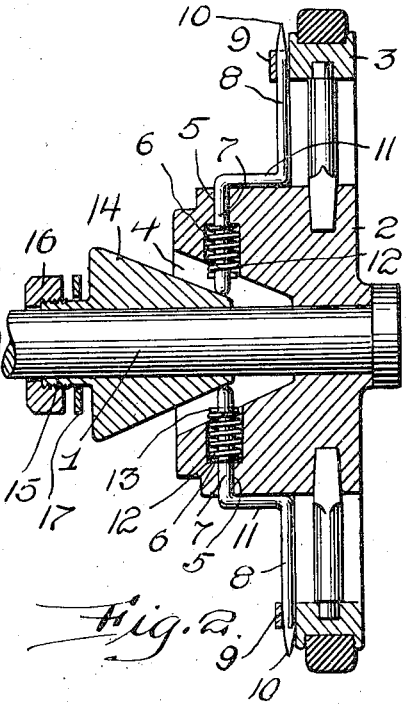
Figure 3:
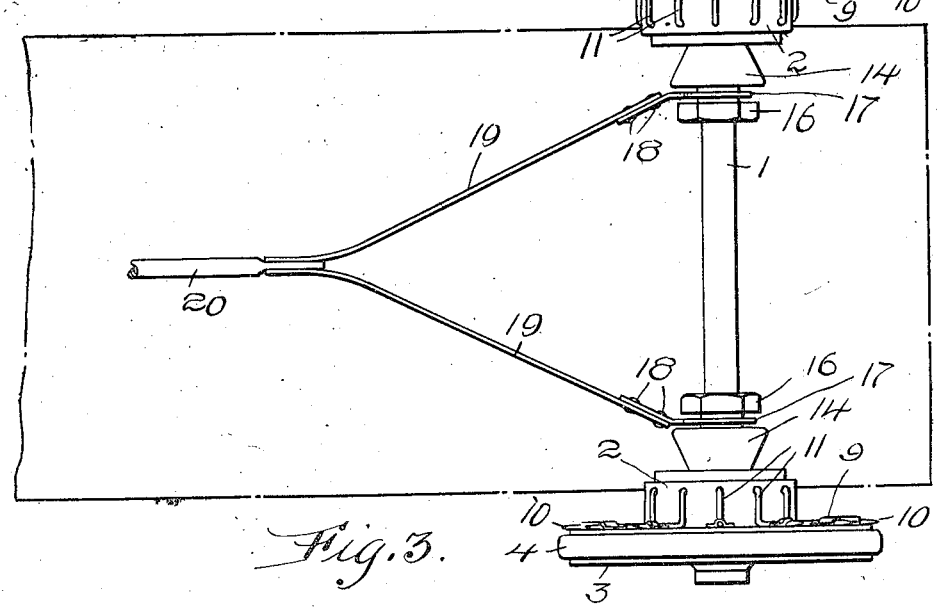

In the drawing: Figure 1 is an elevation of the inner side of a wheel provided with the anti-skidding device. Fig. 2 is a cross sectional view of the same, and Fig. 3 is a plan of a set of wheels provided with the anti-skidding devices.

The reference numeral 1 denotes, by way of an example, the rear axle of an automobile and mounted upon the ends of said axle are the hubs 2 of wheels 3. The inner side of each hub 2 is enlarged and provided with a conical-shaped recess 4 that surrounds the axle 1. The hub is furthermore provided with radially disposed openings 5 in communication with sockets 6 formed in the walls of the recess 4, the sockets 6 and the openings 5 being equally spaced circumferentially of the inner side of the hub 2.

Movably mounted in the openings 5 and extending into the recess 4 are the inner ends 7 of gripping arms 8 that are slidably mounted in bearings 9 secured to the inner side of the rim of the wheel 3, as shown in Fig. 1. The outer ends of the arms 8 are pointed, as at 10 and said arms have lateral portions 11 normally engaging the periphery of the hub 2, these lateral portions limiting the inward movement of said arms and supporting the pointed ends thereof at a point within the periphery of the tire of the wheel. The inner ends 7 of the arms are encircled by coiled retractile springs 12, said springs being located within the sockets 6, between the inner ends of said sockets and transverse pins 13 mounted in the arms. The inner ends of the arms 8 are rounded and normally engage a cone 14 slidably mounted upon the axle 1. The inner end of the cone 14 has a sleeve 15 upon which is screwed or otherwise mounted a nut 16 that is spaced from the inner end of the cone.

Movably mounted upon the sleeve 15 is a shiftable washer or ring 17 and the washers or rings are connected, as at 18 to flexible straps 19 connected to the end of an operating rod 20.

To place the anti-skidding devices in position to prevent the wheels 3 from slipping or sliding upon smooth and wet surfaces, it is only necessary to shift the rod 20 toward the axle 1, said rod causing the flexible straps 19 to shift the washers 17 and force the cones 14 into the recesses 4. The flexible straps tend to buckle and consequently the washers 17 are forced outwardly causing the cones 14 to force outwardly upon the inner rounded ends 7 of the arms 8, thereby placing the pointed ends 10 of said arms beyond the periphery of the tire of the wheel 3, the pointed ends of said arms engaging in a smooth or wet surface and preventing the tires from skidding thereon. When the rod 20 is released the coiled retractile springs 12 restore the arms 8 to their normal position while the straps 19 restore the cones 14 to their normal position.

From the foregoing it will be observed that the use of the anti-skidding means is optional to the operator of an automobile and need only be resorted to when curved or wet sections of road or street is encountered. The anti-skidding means permits of a car taking a curve at considerable speed without danger to the lives of the occupants of the car.

For the convenience of illustration, I have illustrated the inner sides of the hubs 2 as having enlargements, but it is to be understood that the mechanical equivalent of this enlargement can be resorted to whereby the anti-skidding devices can be applied to the present type of wheels.

What I claim is:—

In an anti-skidding device for wheels, the combination with a wheel having its hub extended inwardly and with the extended portion annularly formed with a beveled inner face, said extended portion further provided with a series of inwardly opening sockets and vertically disposed openings communicating with the sockets, spaced bearings secured to the inner side of the felly of the wheel, radially disposed gripping arms extending through said bearings and having L-shaped inner ends seated upon said extended portion and further projecting through said openings and sockets, the vertical arm of said L-shaped ends provided with pins, springs surrounding the vertical arms of the L-shaped ends and interposed between said pins and the bottoms of said sockets, and means adapted to engage in the inner termini of the vertical arms of said L-shaped ends for shifting said gripping members outwardly and beyond the periphery of the wheel.

In testimony whereof I affix my signature in the presence of two witnesses.

PORTER D. ALBERT.

Witnesses:
 MAX H. SROLOVITZ,
 KATHERINE ERRETT.

---

Copies of this patent may be obtained for five cents each, by addressing the "Commissioner of Patents, Washington, D. C."